United States Patent Office 3,335,982
Patented Aug. 15, 1967

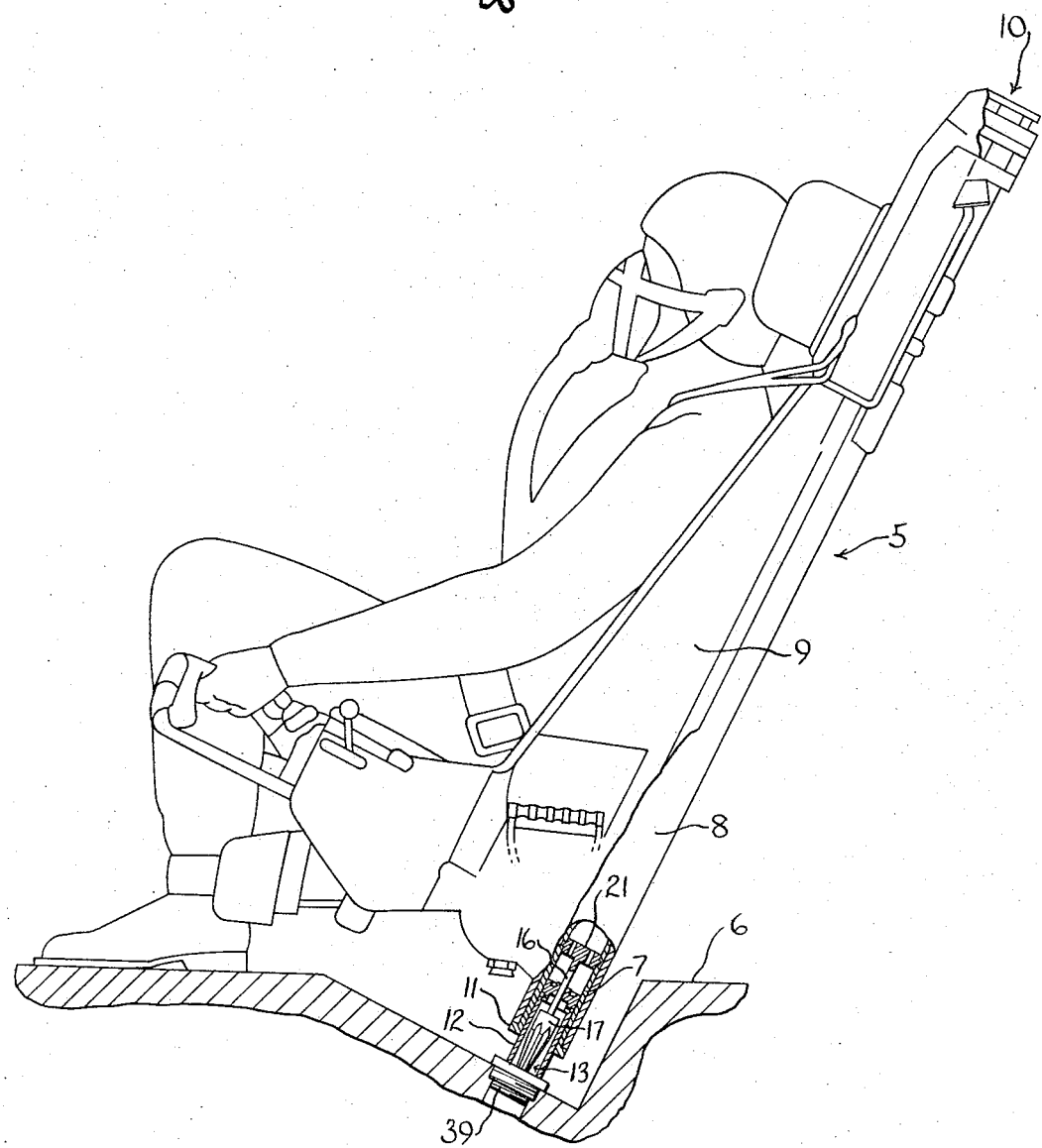

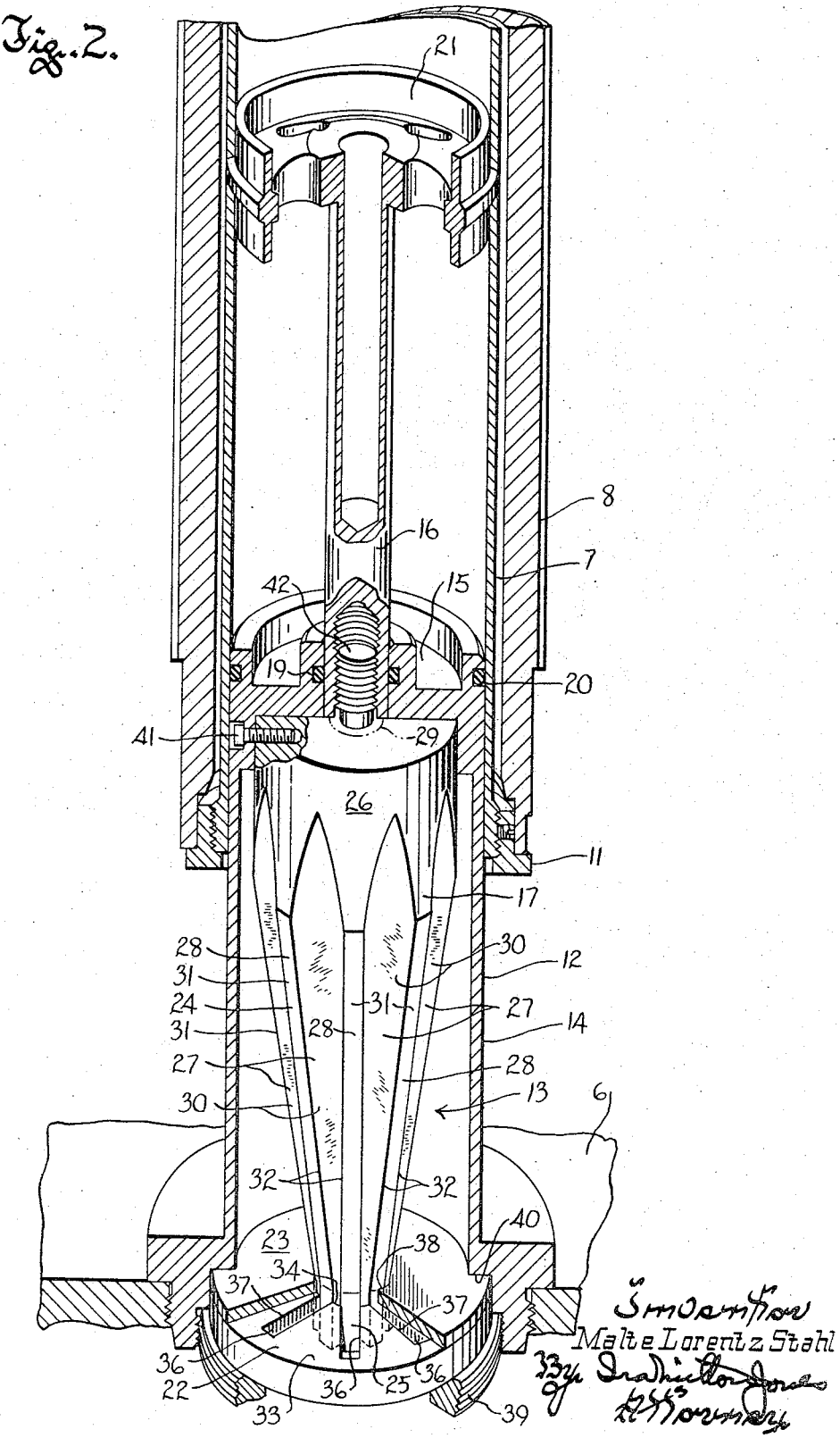

3,335,982
IMPACT ABSORBING DEVICES
Malte Lorentz Stahl, Linkoping, Sweden, assignor to Saab Aktiebolag, Linkoping, Sweden, a corporation of Sweden
Filed Dec. 9, 1965, Ser. No. 512,669
Claims priority, application Sweden, Dec. 12, 1964, 15,064/64
4 Claims. (Cl. 244—122)

This invention relates to aircraft ejection seats, and pertains more particularly to an arrangement comprising an ejection seat mechanism and an impact absorber or crash damper which is so connected with the ejection seat as to be capable of yieldingly absorbing downward momentum forces upon the seat, to cushion shock to the seat occupant in a wheels-up crash landing or the like.

An impact absorber generally consists of a pair of relatively movable members, one of which comprises a frangible element and the other of which comprises a reshaping element that is adapted to dissipate energy in reshaping the frangible element during relative motion between the members. Each of the members of the impact absorber is designed to be connected to one of a pair of bodies which are normally maintained in fixed relation to one another but which are permitted by the impact absorber to have limited relative motion upon an impact against one of the bodies in order to cushion shock to the other.

The present invention contemplates the connection of the members of an impact absorber respectively with an airframe or aircraft structure and with an ejection seat mechanism, whereby the impact absorber is effective to permit energy dissipating downward motion of the ejection seat relative to the airframe in the event of a wheels-up crash landing or the like.

An ejection seat mechanism typically comprises an upright ejection gun consisting of inner and outer normally telescoped tubes, to the outer one of which a seat pan is attached. Upon ejection, pressure gas generated within the telescoped tubes propels the outer tube axially upwardly, out of telescoped relation with the inner tube, while the inner tube remains connected to the aircraft structure.

During ejection, the seat occupant is subjected to acceleration forces of as high as 20g, and equal and opposite reaction forces are of course imposed upon the airframe. However, an impact absorber is intended to yield under load forces corresponding to an acceleration of a seat occupant at about 15g. Nevertheless, it is essential that an impact absorber associated with an ejection seat should not be actuated by the reaction forces of seat ejection. Furthermore, it is a requirement of an arrangement incorporating an impact absorber and an ejection seat that the seat ejection mechanism should remain capable of operating after the impact absorber has functioned, to enable the seat occupant to eject himself after a severe crash landing in order to escape from fire or the like. An ejection mechanism of course propels the airman sufficiently high so that a parachute carried up with the seat can deploy in time to assure the airman's safe descent.

With the foregoing considerations in mind, it is the general object of the present invention to provide structure comprising an aircraft ejection seat mechanism and an impact absorber or crash damper which is connected between the ejection seat mechanism and an aircraft frame and which yields to relatively downward load forces on the seat in excess of a predetermined value, but which is not actuated by the reaction forces of seat ejection and does not interfere with seat ejection after it has yielded.

More specifically it is an object of this invention to provide an inexpensive, compact and dependable safety seat mechanism for an airman, comprising an ejection gun having inner and outer tubes, axially opposing abutment means on the tubes for transferring downward load forces from a seat on the outer tube to the inner tube, an upright supporting member over which the inner tube is normally partway telescoped and which provides sliding guidance to the inner tube during its downward crash damping motion plug, means fixed on the top of the supporting member to sealingly close the bottom of the inner tube and to receive the reaction force of pressure gas during ejection, relatively fixed and movable impact absorbing members housed in the upright supporting member, one of said members being a frangible element and the other being a reshaping element cooperable with the frangible element to dissipate energy in reshaping the same during relative motion between said members, a spider secured in the inner tube a distance above the plug means, and a push rod axially slideably extending through the plug means in sealing relation thereto and connected with the spider and with the movable member of the impact absorber to constrain said movable member to crash damping downward motion with the inner tube.

It is also an object of this invention to provide an ejectable safety seat for an airman which incorporates the impact absorber of my copending application, Serial No. 512,735, filed December 9, 1965, and which therefore possesses the important advantage of inhibiting relative upward motion of the seat after the impact absorber has been actuated for downward impact responsive cushioning motion of the seat, so that by reason of such inhibition of upward motion the airman is protected against injury due to a secondary or rebound impact or acceleration in the direction opposite to that which induced actuation of the impact absorber.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a view generally in side elevation, but with portions cut away, of an ejectable aircraft safety seat incorporating an impact absorber in an arrangement embodying the principles of this invention;

FIGURE 2 is a vertical sectional view on a larger scale of the lower portion of the assembly comprising the seat ejection gun and the impact absorber, shown in their normal conditions.

Referring now to the accompanying drawings, the numeral 5 designates generally an ejection seat mechanism adapted to be secured to the frame 6 of an aircraft and comprising upright normally telescoped inner and outer tubes 7 and 8 and a seat pan 9 which is secured to the outer tube. The tubes 7 and 8 of course comprise a more or less conventional seat ejection gun. Upon ejection, the outer tube 8, along with the seat pan 9, is adapted to be propelled axially upwardly off of the inner tube 7 by pressure gases generated within the gun, while the inner tube remains connected with the aircraft frame.

The tubes 7 and 8 are normally held in fully telescoped relation to one another by means of a known locking mechanism 10 which is located at the top of the gun and which is released at the time of ejection. The lower end of the outer tube 8 rests upon a radially outwardly projecting circumferential flange 11 at the bottom of the inner tube to thereby transfer to the inner tube downward load forces imposed upon the seat pan and the outer tube.

The ejection gun is mounted upon an upright tubular supporting member 12 which is secured at its bottom to the aircraft frame 6 and which is partway telescoped into the lower end portion of the inner tube 7. The tubular supporting member 12 serves as a housing for an impact absorber designated generally by 13, and its cylindrical outer surface 14 affords axial guidance to the inner tube 7 during impact produced downward motion thereof through a limited distance, in the course of which motion the impact absorber dissipates momentum energy of the seat occupant and ejection seat mechanism.

The tubular supporting member 12 also serves as a plug for the lower end of the inner tube 7, to receive the reaction of pressure gases during seat ejection, and to that end the supporting member has on its top an annular wall or plug portion 15. A push rod 16, which connects the inner tube 7 with the movable element 17 of the impact absorber 13, extends with an axially slidable seal through the coaxial aperture in the plug portion 15. A sealing ring 19 is radially confined between the push rod 16 and the plug portion 15, and another sealing ring 20 is similarly confined between the supporting member 12, near the top of the latter, and the inner tube 7.

The connection between the inner tube 7 and the push rod 16, through which downward load forces upon the inner tube are imposed upon the movable element 17 of the impact absorber 13, comprises a spider or apertured bulkhead 21 that is fixed in the inner tube at an axial location such that the spider is normally spaced above the plug portion 15 by at least the distance that the inner tube is allowed to travel during actuation of the impact absorber.

As illustrated in FIGURE 2 the impact absorber 13 is of the type described and claimed in my above mentioned copending application, to which reference may be made for full details, and wherein the movable element 17 comprises a shearing punch that cooperates with a fixed shearing die element 22 to effect progressive shearing of a fixed homogeneous wall element 23 all during impact produced descent of the punch.

The movable element or punch 17 of the impact absorber is symmetrical about the coinciding axes of the supporting member 12 and the push rod 16. It has a generally frustoconical midsection 24 which tapers downwardly to a small diameter cylindrical bottom portion 25 and diverges upwardly to a larger diameter cylindrical top portion 26 that is normally received with a fairly close fit in the upper portion of the supporting member 12, just below its plug portion 15. The frusto conical midsection 24 of the punch has a plurality of lengthwise extending grooves 27 which are V-shaped as viewed from either end of the punch and which preferably continue through its small diameter cylindrical bottom portion 25. These grooves define axially extending lands or ridges 28 that project radially from a central core portion 29 which is of uniform radius along the length of the punch. The lands or ridges of course taper in their radial dimensions toward the bottom of the punch, due to the generally frustoconical shape of its midsection.

Each of the lands has its side surfaces 30 parallel to and spaced equal distances to opposite sides of a plane lying on the punch axis, and said side surfaces meet the outer circumferential surface 31 of the punch at sharply square corners 32 which define the shearing edges on the punch. Thus the punch has its shearing edge portions 32 facing obliquely downwardly and outwardly.

The die element 22 is a disk-like member that has a flat upper surface 33 which is normal to the punch axis and which the wall element 23 flatwise overlies. A central aperture 34 in the die element is large enough for the core portion 29 of the punch to pass through as the punch descends, and from that aperture radiate slots 36 which are shaped to closely receive the lands 28 on the punch and to provide shearing edge portions 37 on the die that face upwardly to oppose and cooperate with the shearing edge portions 32 on the punch.

The wall element 23 is also disk-like and has a central aperture 38 through which the lower cylindrical portion 25 on the punch normally projects downwardly into the aperture 34 in the die element.

By means of a clamping ring 39 threaded into the lower portion of the supporting member 12, the die element 22, and the wall element 23 overlying it, are clamped against a seat defined by a downwardly facing circumferential shoulder 40 formed in the supporting member just above its bottom. The die element and wall element are thereby secured in a fixed relation to the supporting member.

Normally, the punch is held against downward motion relative to the supporting member by means of frangible screws 41 which extend radially through clearance holes in the upper portion of the supporting member and are threaded into the cylindrical top portion 26 of the punch. These screws, however, are sheared by a sufficiently large downward force on the punch, so that the punch can descend in response to such force. As the punch descends, the shearing edge portions 32 on it cooperate with the shearing edge portions 37 on the die to shear strips out of the wall element 23. It will be observed that the cooperating shearing edges are so arranged that shearing action takes place all during punch descent, assuring that energy will be dissipated at a uniform rate throughout the descending motion of the punch.

The operation of the mechanism will now be described with reference to each of the several conditions it is intended to accommodate.

If the seat is ejected at a time when no impact has occurred (as when the aircraft is airborne), the rapidly expanding pressure gases that are generated in the ejection gun can readily pass downwardly through the spider or apertured bulkhead 21 to react against the fixed plug portion 15 on the supporting member 12. The pressure gases will impose a small downward force upon the spider, inasmuch as its effective bottom surface area is smaller than its top surface area by the cross-sectional area of the push rod 16; but this net downward force upon the spider will not be great enough to actuate the punch, which can move only in response to substantially large forces, e.g. a mass load of about 15g on the pilot and ejection seat mechanism. Hence during such ejection the inner tube 7 will remain in its normal position, telescoped only part way over the tubular supporting member 12.

When the impact absorber is in its normal position, it will not be displaced by substantial upward loads on the seat mechanism (such as might be produced by flight into a severe downdraft) because the gun tubes are locked together by the locking mechanism 10 and the inner tube is connected to the supporting member 12 through the spider 21, the push rod 16, the punch 17 and the frangible screws 41.

It will be evident that in the event of a wheels-up crash landing or other severe upward impact upon the aircraft structure, downward momentum forces of the seat occupant and ejection gun mechanism are transmitted to the punch, and if such forces are great enough the frangible screws 41 will be sheared and the punch will descend, shearing the wall element 23 and thereby dissipating momentum energy as explained above. The ejection gun will of course move downward under damping control of the punch, being axially guided in such motion by the supporting member 12.

After actuation of the impact absorber, the seat ejection mechanism remains in all respects in condition for operation. Again, in the case of ejection after crash damping, the reaction force to seat ejection is received by the plug portion 15 of the supporting member 12.

Should the impact which actuates the impact absorber be followed by a secondary or rebound impact which imposes a relatively upward mass load upon the seat mechanism, the impact absorber will inhibit upward displacement of the seat, owing to friction between the sheared wall element 23 and the punch. Tests have shown that the actuated impact absorber resists upward load forces equivalent to a 6g mass load of the seat and occupant.

It will be apparent that assembly of the mechanism of this invention is quite simple. The supporting member 12 is so mounted on an aircraft frame structure 6 that its interior is accessible from underneath. The inner tube 7, with the spider 21 and the push rod 16 secured to it, is then telescoped over the supporting member, until the push rod comes down through the central aperture in the plug portion 15. The punch is then inserted up into the supporting member and is connected to the push rod. To facilitate such connection, the push rod and punch are preferably provided with mating threaded portions, as at 42. The frangible screws 41 can then be threaded into place to hold the punch against axial motion and establish the normal position of the inner tube. Next the wall element 23, shearing die 22 and clamping ring 39 can be assembled upwardly into the supporting member, and finally, the remainder of the ejection gun can be assembled to the inner tube in a conventional manner.

From the foregoing description taken with the accompanying drawings it will be apparent that this invention provides a dependable, compact and easily assembled aircraft safety seat arrangement comprising an ejection gun by which the seat and its occupant can be propelled out of an aircraft in which the arrangement is mounted, and an impact absorber or crash damper by which the seat occupant is cushioned against severe relatively upward impacts against the aircraft, and wherein the impact absorber is not actuated by seat ejection and does not interfere with operation of the ejection gun either before or after the impact absorber is actuated.

What is claimed as my invention is:

1. In combination with an aircraft seat ejection gun having a substantially upright inner tube which is adapted to remain connected to aircraft structure and an outer tube to which a seat pan is secured and which is adapted to be propelled axially out of normally telescoped relation to the inner tube by pressure gas:
   (A) axially opposing abutment means on the inner and outer tubes by which downward load forces on the outer tube are imposed upon the inner tube;
   (B) an impact absorber comprising relatively fixed and movable members,
       (1) one of said members comprising a frangible element, and
       (2) the other of said members comprising a reshaping element cooperable with the frangible element to expend energy in reshaping the same during relative motion between the members;
   (C) a substantially upright tubular support to which the relatively fixed member of the impact absorber is fixed and which houses the relatively movable member of the impact absorber, said tubular support being normally partway telescoped into the lower portion of the inner tube and being adapted to afford sliding guidance to the inner tube for downward motion thereof through a limited distance;
   (D) means fixed on said tubular support defining an annular wall for sealingly closing the bottom of the inner tube and which receives the reaction of pressure gas during seat ejection;
   (E) a spider anchored in the inner tube and normally spaced at least said distance above the annular wall, said spider being shaped to permit axial flow of gases therepast; and
   (F) a push rod connected between the spider and the movable member of the impact absorber and extending through said annular wall in axially slideable sealing relation thereto, for transferring downward load forces from the inner tube to the movable member of the impact absorber.

2. In combination with an aircraft seat ejection gun having a substantially upright inner tube which is adapted to remain connected to aircraft structure and an outer tube to which a seat pan is secured and which is adapted to be propelled axially out of normally telescoped relation to the inner tube by pressure gas:
   (A) cooperating axially opposed abutment means on the inner and outer tubes by which downward load forces on the outer tube are transferred to the inner tube;
   (B) an impact absorber comprising relatively fixed and movable members,
       (1) one of said members comprising a frangible element, and
       (2) the other of said members comprising a reshaping element cooperable with the frangible element to expend energy in reshaping the same during relative motion between the members;
   (C) a substantially upright guide element which is fixed with respect to the relatively fixed member of the impact absorber and the upper portion of which is received in the lower portion of the inner tube, said guide element
       (1) having portions cooperable with the inner tube and with the movable member of the impact absorber to guidingly constrain them to coaxial downward motion, and
       (2) having a portion at its top defining a plug by which the bottom of the inner tube is sealingly closed and which receives the reaction of pressure gas during seat ejection; and
   (D) force transfer means connected between the inner tube and the movable member of the impact absorber and extending through a portion of said guide element for imposing downward load forces from the inner tube upon said movable member and for constraining the latter to move downwardly with the inner tube.

3. In combination with structure adapted to be fixed in an aircraft:
   (A) a seat ejection gun comprising
       (1) a substantially upright inner tube which is adapted to remain connected to said structure,
       (2) an outer tube to which a seat pan is secured and which is adapted to be propelled axially upwardly out of normally telescoped relation with the inner tube by pressure gas, and
       (3) axially opposed abutment means on said tubes by which downward load forces are transferred from the outer tube to the inner tube;
   (B) a substantially upright tubular support fixed to said structure and over the upper end portion of which the bottom portion of the inner tube is telescoped, said tubular support
       (1) having an axially extending outer surface which is adapted to afford sliding guidance to the inner tube for limited downward motion of the latter, and
       (2) having plug means fixed on its top for sealingly closing the bottom of the inner tube and receiving the reaction force of pressure gas during seat ejection;
   (C) a homogeneous wall element fixed in said tubular support;
   (D) a shearing die fixed in said tubular support and having a surface which said wall element overlies and on which there are shearing edge portions;
   (E) a shearing punch coaxially movable in said tubular support and normally disposed at the side of the wall element remote from the shearing die, said punch having shearing edge portions which oppose those on the die and are arranged to cooperate with them for effecting progressive shearing of the wall element during descent of the punch;

(F) a spider secured in the inner tube for downward movement therewith and normally spaced a substantial distance above said plug means; and (G) a coaxial push rod extending through said plug means in axially slideable sealing relation thereto and connecting said spider with the shearing punch.

4. The combination of claim 3, wherein said shearing die is disk-like with a flat upper surface and has an aperture therein which defines shearing edge portions on said flat upper surface, and wherein said wall element is disk-like and flatwise overlies said upper surface on the shearing die, further characterized by:

(A) means fixed on said tubular support defining a coaxial downwardly facing circumferential shoulder near the bottom thereof against which the upper peripheral surface of the wall element is engaged; and (B) a clamping ring secured to the bottom portion of the tubular support and engaging the lower surface of the shearing die to clampingly confine it and the wall element against said shoulder defining means.

References Cited

UNITED STATES PATENTS 3,059,966  10/1962  Spielman.

MILTON BUCHLER, *Primary Examiner.*

B. BELKIN, *Assistant Examiner.*